United States Patent [19]

Nicholson

[11] 4,387,393
[45] Jun. 7, 1983

[54] SIGNAL UNSCRAMBLER
[75] Inventor: Keith B. Nicholson, Ocala, Fla.
[73] Assignee: Microdyne Corporation, Ocala, Fla.
[21] Appl. No.: 168,668
[22] Filed: Jul. 11, 1980
[51] Int. Cl.³ .......................... H04N 7/16; H04K 1/08
[52] U.S. Cl. ..................................... 358/124; 307/262; 307/321; 307/513
[58] Field of Search ....................... 307/262, 321, 513; 358/124

[56] References Cited
U.S. PATENT DOCUMENTS
3,075,136 1/1963 Jones .................................. 307/321
3,527,877 9/1970 Walker ................................. 358/124
3,801,732 4/1974 Reeves ................................. 358/124

OTHER PUBLICATIONS
Sony Model TV-115, H. W. Sams & Co., Inc., 1974.

Primary Examiner—S. C. Buczinski
Attorney, Agent, or Firm—Howard L. Rose

[57] ABSTRACT

A received video signal that has been inverted at the transmitter is reinverted by the use of low cost pin diodes to reverse the ground and signal lead connections to the primary winding of a transformer operating at RF frequencies.

3 Claims, 3 Drawing Figures

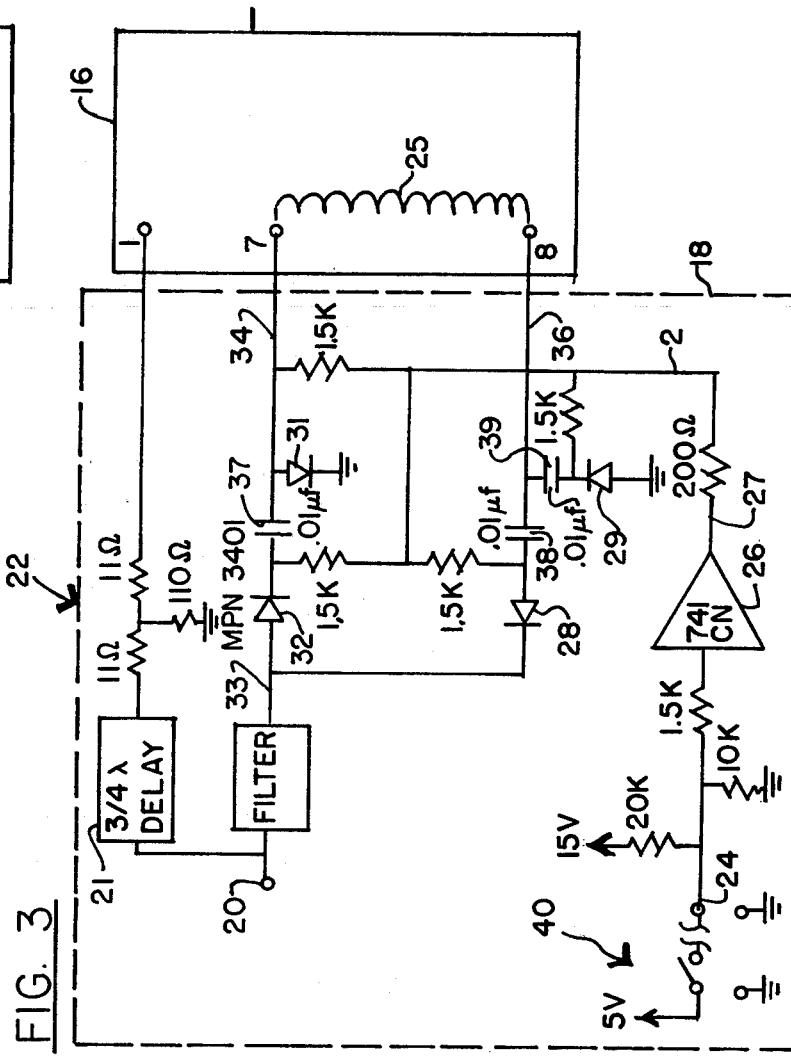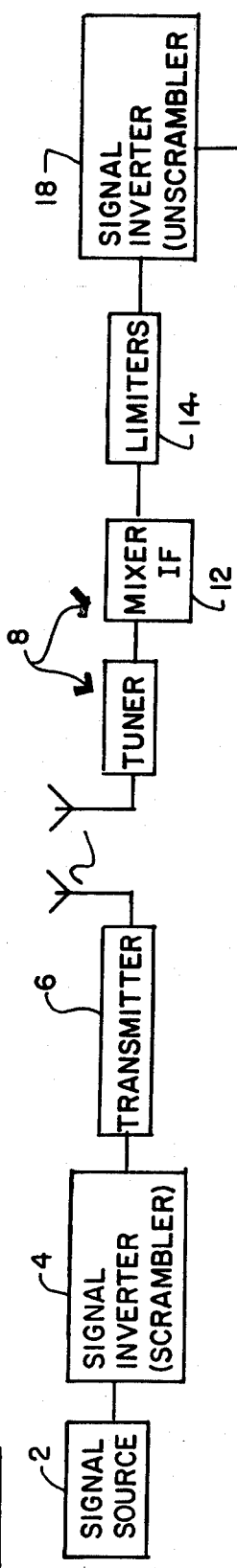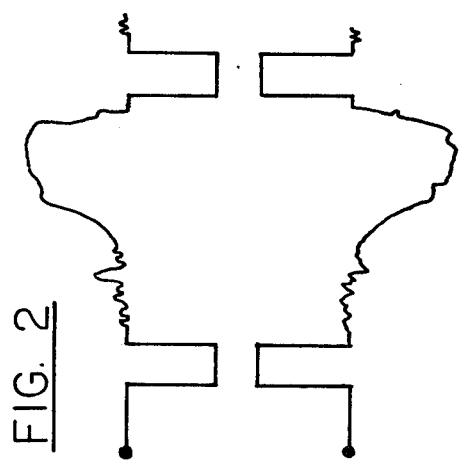
FIG. 1
FIG. 3
FIG. 2

SIGNAL UNSCRAMBLER

RELATED APPLICATIONS

This application is related to copending application, Ser. No. 168,665, filed July 11, 1980 in the names of Michael S. Balbes, Charles E. Day, Robert L. Hooper and Hank S. Lin for Receive Only Earth Satellite Ground Station.

BACKGROUND OF THE INVENTION

The present invention relates to a signal unscrambler for television systems and more particularly to a low cost signal unscrambler for utilization with scramblers producing inverted video signal.

It is common practice to prevent unauthorized reception of transmitted television signals to invert the video at the transmitter whereby picture signals are reproduced at the receiver. To unscramble the signal, the received video signals must be reinverted and this has been accomplished by the use of high cost relays, controls and noise suppression circuits. The cost of such systems thus represent a disproportionate part of the total cost of low cost systems, particularly receive only earth satelllite ground stations now being introduced for commercial, industrial and to some extent home markets.

BRIEF DESCRIPTION OF THE INVENTION

In accordance with the present invention, a simple, low cost signal unscrambler is provided for use particularly in satellite television systems. An example of a specific use of the apparatus of the invention is found in copending patent application Ser. No. 168,665 filed on concurrent date herewith in the name of Balbes, et al for Receive Only Earth Satellite Ground Station assigned to the assignee of the present invention.

The signal scrambler at the transmitter inverts the transmitted signal so that the video is, in the absence of special receiving equipment, totally unusable.

In accordance with the present invention, the inverted signal is processed through the receiver's tuner, IF and limiter stages and is inverted immediately prior to application to the receiver demodulator. Thus, inversion is affected at RF frequencies and as a result, a simple circuit utilizing low cost pin diodes may be employed.

The basic approach employed for unscrambling is to reverse the connection of a lead bearing the IF signals to the primary winding of a transformer when receiving scrambled as opposed to unscrambled signals. Thus, the output voltage from the secondary winding of the transformer is reversed in the one case as opposed to the other. As indicated as the result of performing the operation at RF frequencies, at 70 MHz in the aforesaid copending application, inexpensive pin diodes may be employed for reversing the connections of the transformer primary to the signal lead. Such an operation at the transponder frequencies, for instance, would require highly sophisticated and costly equipment.

It is, therefore, an object of the present invention to provide a simple low cost, signal unscrambling system for use in communication networks.

It is another object of the present invention to provide in a signal scrambling system which inverts a transmitted signal relative to its base line, an unscrambling system utilizing low cost elements to reinvert the signal to its original base line orientation.

Still another object of the present invention is to provide a plurality of low cost diodes operating at relatively low frequencies, RF, to invert a signal relative to its base line.

Certain embodiments of this invention will now be described by reference to the accompanying drawings wherein:

BRIEF DESCRIPTION OF DRAWINGS

FIG. 1 is a block diagram of the system of the present invention;

FIG. 2 is a plot of the scrambled and unscrambled signals; and

FIG. 3 is a schematic circuit diagram of the signal unscrambler of the present invention.

DESCRIPTION OF PREFERRED EMBODIMENT

Referring specifically to FIG. 1 of the accompanying drawings, a source of signals 2 provides an output signal to a signal scrambler 4 which inverts the signal relative to its base line and supplies it to a transmitter for transmission to a remote location.

Referring specifically to FIG. 2, curves A and B illustrate a video signal before and after inversion. It can be seen that normal receivers cannot process the picture signals and receipt of such signals by a conventional receiver will produce no picture. In order for the receiver to reproduce the transmitted signals, it must be modified to include a signal unscrambler.

The transmitter 6 although illustrated as being part of an electromagnetic wave transmission system, may readily be employed in a wire link system; the transmission system employed not being affected by or affecting the signal processing with which the invention is employed.

Continuing with the description of FIG. 1, a receiver generally designated by reference numeral 8 comprises a tuner 10 followed by a mixer IF section 12 for reducing the received frequencies, for example 3 GHz to 4 GHz to RF frequencies, for example, in the 70 MHz range the signals are then processed through a series of high gain hard limiters 14 for removing all AM signals before demodulation by demodulator 16.

According to the present invention, unscrambling is introduced immediately prior to the demodulator by connecting a signal inverter 18 between the limiters 14 and the demodulator 16.

The signal from the limiters 14 appears on terminal 20 of FIG. 3, and is applied to the demodulator 16 via a $\frac{3}{4}$ wave length delay line generally designated by reference numeral 21 and thence through a T-pad 22 to a terminal 1. The $\frac{3}{4}$ wave delay line is employed to shrink the peak to peak separation of the signal to improve the overall sensitivity of the demoulator and thus provide better performance and forms a novel feature of the U.S. patent application Ser. No. 782,202 filed on Mar. 28, 1977 by Lennox, et al for DEMODULATOR FOR FREQUENCY MODULATED SIGNALS now U.S. Pat. No. 4,288,876 and assigned to the assignee of the present invention. The signal on terminal 20 is normally applied to pin 7 of the demodulator while the pin 8 is normally grounded. The primary winding, designated by reference numeral 26, of the input transformer of the demodulator is connected between input terminals 7 and 8 thereof. In accordance with the present invention, the signal on terminal 20 is applied to pin 7 or pin 8, depending upon whether the signal is unscrambled or scrambled, respectively. Thus, in order to effect the signal reversal in the event of receipt of a scrambled signal, the terminals 7 and 8 are switched; that is, the terminal 7 is grounded and the signal is applied to the terminal 8. This switching is accomplished by that part of the circuit in FIG. 3 enclosed within a dashed box and having reference numeral 18 applied thereto.

A d.c. control signal applied to a terminal 24 and through amplifier 26 to a lead 27 is employed for controlling conduction of two of four diodes 28, 29, 31, and 32. The 70 MHz signal on the terminal 20 is applied via a lead 33 to the diode network and leads 34 and 36 connect the terminal 7 and 8 respectively to the diode network.

In operation, if a positive voltage appears on the lead 27, the diodes 28 and 31 are rendered conductive, in which case the signal on lead 33 is applied to the lead 36 and thence the terminal 8 while the terminal 7 via lead 34 and diode 31 is grounded. In this instance, the signal is reversed in that, the ground is applied to terminal 7 whereas in FIG. 3 the terminal 8 is grounded and the signal is applied to the terminal 7.

If a negative voltage appears on lead 27, the diodes 29 and 32 are rendered conductive and the signal appearing on lead 33 is applied to the terminal 7 via the diode 232 while the terminal 8 is connected to ground through the now conducting diode 29.

Capacitors 37, 38 and 39 are d.c. blocking capacitors employed to isolate transformer winding 25 from d.c. A capacitor is not required for use with diode 31 since d.c. is blocked by capacitor 39.

Thus, by simple pin diode network and control 23, the signal may be readily unscrambled by the use of a low voltage d.c. which may be no more than 5 to 15 volts applied to the terminal 24. By effecting the unscramble control at RF frequencies, inexpensive pin diodes may be employed rather than expensive relays and drivers, etc. that would be required if the conversion were made at video frequencies.

The control signal applied to amplifier 26 may be locally or remotely generated. In the former case, lack of reception of correct video on a selected channel may indicate a scrambled signal. A switch 40 may be provided which when positioned in the scramble mode applies an appropriate positive signal to the amplifier 26 to reverse polarity and unscramble the information signals. In remote control operation, a subcarrier tone may be transmitted and upon detection produce the desired control signal.

Thus, it is seen that by the use of a simple terminal reversing network consisting of inexpensve, readily available components, a few diodes, resistors and capacitors, signal unscrambling is provided.

Once given the above dislcosure, many other features, modifications and improvements will become apparent to the skilled artisan. Such other modifications, features and improvements are, therefore, considered a part of this invention, the scope of which is to be determined by the following claims.

I claim:

1. A signal unscrambler for inverting a previously inverted signal comprising:
   a first and a second input terminal having a signal applied therebetween,
   a first and a second lead,
   means for developing on said first and second leads the signal appearing on said first and second input terminals,
   said means including a first unidirectionally conducting device coupled between said first input terminal and said first lead,
   a second unidirectionally conducting device coupled between said first input terminal and said second lead,
   a third unidirectionally conducting device connected between said first lead and said second input terminal,
   a fourth unidirectionally conducting device coupled between said second lead and said second input terminal,
   means for concurrently rendering said first and fourth devices conductive and for alternatively rendering said second and third devices conductive, and
   a transformer winding connected between said first and second leads.

2. A signal unscrambler as described in claim 1 wherein said signals are at RF frequencies and said devices are pin diodes.

3. In a system having a transformer input and a further input to an FM signal demodulator, a signal unscrambler comprising:
   a lead having an FM signal thereon,
   means for coupling said FM signal at a phase of 270° relative to said FM signal on said lead,
   said transformer input to the FM demodulator having a primary winding with a first end and a second end,
   means for alternatively applying said FM signal to said first and said second end, respectively, of said primary winding while grounding said second and said first end, respectively, of said primary winding, to shift selectively the phase of the FM signal applied to said transformer input by 180°.

* * * * *